United States Patent
Kataoka et al.

(10) Patent No.: US 10,318,483 B2
(45) Date of Patent: Jun. 11, 2019

(54) CONTROL METHOD AND CONTROL DEVICE

(71) Applicant: FUJITSU LIMITED, Kawasaki-shi, Kanagawa (JP)

(72) Inventors: Masahiro Kataoka, Tama (JP); Takaki Ozawa, Numazu (JP); Nobuyuki Takebe, Numazu (JP); Ryo Matsumura, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 390 days.

(21) Appl. No.: 14/661,012

(22) Filed: Mar. 18, 2015

(65) Prior Publication Data

US 2015/0193462 A1     Jul. 9, 2015

Related U.S. Application Data

(63) Continuation of application No. PCT/JP2012/006011, filed on Sep. 21, 2012.

(51) Int. Cl.
*G06F 16/174* (2019.01)
*G06F 16/903* (2019.01)

(52) U.S. Cl.
CPC .... *G06F 16/1744* (2019.01); *G06F 16/90344* (2019.01)

(58) Field of Classification Search
CPC ............... G06F 17/214; G06F 17/2872; G06F 17/30595; G06F 17/30985
See application file for complete search history.

(56) References Cited

U.S. PATENT DOCUMENTS 4,495,600 A * 1/1985 Kikuchi ............... G06F 17/245
                                                    400/279
5,448,733 A * 9/1995 Satoh ................ G06F 17/30985
(Continued)

FOREIGN PATENT DOCUMENTS

JP       01-297718       11/1989
JP       05-224878        9/1993
(Continued)

OTHER PUBLICATIONS

Japanese Office Action dated Mar. 1, 2016 in corresponding Japanese Patent Application No. 2014-536413.
(Continued)

*Primary Examiner* — Angelica Ruiz
(74) *Attorney, Agent, or Firm* — Staas & Halsey LLP

(57) ABSTRACT

A non-transitory computer-readable recording medium has stored therein a program for causing a computer to execute a process. The process includes: when obtaining a character string including one unit of character information at one position in the character string, referring to presence/absence information indicating whether or not at least one character string, in a character string group including a plurality of character strings to which compression codes have been assigned, includes the one unit of character information at the one position; and searching the character string group for the obtained character string except for a case that the presence/absence information indicates that none of the character strings included in the character string group include the one unit of character information at the one position.

6 Claims, 12 Drawing Sheets

(56) References Cited

U.S. PATENT DOCUMENTS

| | | | | |
|---|---|---|---|---|
| 5,537,633 | A | * | 7/1996 | Suzuki ................ G06F 17/245 |
| 5,717,393 | A | * | 2/1998 | Nakano ................ H03M 7/30 |
| | | | | 341/106 |
| 6,404,362 | B1 | * | 6/2002 | York ................ H03M 7/3084 |
| | | | | 341/106 |
| 6,415,295 | B1 | * | 7/2002 | Feinberg ............ G09F 3/0288 |
| 2002/0196166 | A1 | * | 12/2002 | Satoh ................ H03M 7/3084 |
| | | | | 341/90 |
| 2003/0197630 | A1 | * | 10/2003 | Border ............. H03M 7/3088 |
| | | | | 341/106 |
| 2004/0164883 | A1 | * | 8/2004 | Horie ................ H03M 7/3086 |
| | | | | 341/51 |
| 2007/0096952 | A1 | * | 5/2007 | Trout ................ H03M 7/3084 |
| | | | | 341/50 |
| 2007/0174482 | A1 | * | 7/2007 | Yajima ................ G06F 17/243 |
| | | | | 709/238 |
| 2007/0245124 | A1 | * | 10/2007 | Furusho ............ G06F 17/30327 |
| | | | | 712/28 |
| 2009/0274294 | A1 | * | 11/2009 | Itani ................ H03M 7/30 |
| | | | | 380/28 |
| 2009/0299973 | A1 | | 12/2009 | Kataoka et al. |
| 2010/0085222 | A1 | | 4/2010 | Kataoka et al. |
| 2010/0232690 | A1 | * | 9/2010 | Kanatsu ............ G06F 17/30011 |
| | | | | 382/165 |
| 2011/0161357 | A1 | | 6/2011 | Kataoka et al. |
| 2011/0264675 | A1 | | 10/2011 | Satoh |

FOREIGN PATENT DOCUMENTS

| | | |
|---|---|---|
| JP | 05-241777 | 9/1993 |
| JP | 2000-036756 | 2/2000 |
| JP | 3263963 | 3/2002 |
| JP | 2003-288288 | 10/2003 |
| JP | 2009-289196 | 12/2009 |
| JP | 2010-093414 | 4/2010 |
| JP | 2011-138230 | 7/2011 |
| JP | 2011-232943 | 11/2011 |
| JP | 2012-142024 | 7/2012 |
| WO | 2008/090606 | 7/2008 |

OTHER PUBLICATIONS

Japanese Office Action dated Aug. 9, 2016 in corresponding Japanese Patent Application No. 2014-536413.

* cited by examiner

FIG.9

|  | 1 TO 2 | 2 TO 3 | 3 TO 4 | 4 TO 5 | 5 TO 6 |
|---|---|---|---|---|---|
| ⋮ | ⋮ | ⋮ | ⋮ | ⋮ | ⋮ |
| aa | 0 | 0 | 0 | 0 | 0 |
| ab | 1 | 0 | 0 | 0 | 0 |
| ⋮ | ⋮ | ⋮ | ⋮ | ⋮ | ⋮ |
| bl | 0 | 1 | 0 | 0 | 0 |
| bm | 0 | 0 | 1 | 0 | 0 |
| bn | 0 | 0 | 0 | 0 | 0 |
| bo | 0 | 1 | 0 | 0 | 0 |
| ⋮ | ⋮ | ⋮ | ⋮ | ⋮ | ⋮ |
| le | 0 | 0 | 1 | 0 | 0 |
| ⋮ | ⋮ | ⋮ | ⋮ | ⋮ | ⋮ |
| or | 0 | 1 | 0 | 0 | 0 |
| os | 1 | 0 | 0 | 0 | 0 |
| ot | 0 | 0 | 0 | 1 | 0 |
| ou | 0 | 0 | 1 | 1 | 0 |
| ⋮ | ⋮ | ⋮ | ⋮ | ⋮ | ⋮ |
| rt | 0 | 0 | 0 | 0 | 0 |
| st | 1 | 0 | 0 | 0 | 1 |
| tt | 0 | 0 | 0 | 0 | 0 |
| us | 0 | 1 | 0 | 1 | 0 |
| ⋮ | ⋮ | ⋮ | ⋮ | ⋮ | ⋮ |

T11

CONTROL METHOD AND CONTROL DEVICE

CROSS-REFERENCE TO RELATED APPLICATION(S)

This application is a continuation of International Application No. PCT/JP2012/006011, filed on Sep. 21, 2012, the entire contents of which are incorporated herein by reference.

FIELD

The embodiments discussed herein are related to data compression technique and data decompression technique.

BACKGROUND

Methods of performing compression by assigning compression codes to character information such as characters and words, using compression algorithms such as Huffman encoding and LZ78, have been known. In a compression process based on such compression algorithms, process of preparing a list of character information to which compression codes have been assigned, searching the list using character information matching the character information which is a compression target, and generating compressed data using compression codes associated with the character information obtained as a result of searching.

Searching of the list performed in the compression process described above is performed by matching between character information in the list and character information of a compression target, and as a result of matching, character information in the list matching the character information of the compression target are specified. Before performing matching with the character information in the list, the range of the matching target in the list may be narrowed using an index prepared in advance.

Further, in the compression process described above, data of a tree structure may be used for searching for character information to which a compression code is associated. For example, a Huffman tree is used in Huffman encoding, and a Trie tree is used in LZ78. With respect to conventional technologies, see Japanese Laid-open Patent Publication No. 2012-142024, and Japanese Laid-open Patent Publication No. 05-224878, for example.

Searching the list of character information, to which compression codes have been assigned by the method described above, is performed by matching between the character information in the list and character information of a compression target. As a result of matching, if they do not match, matching is performed again on the next character information in the list. If matching between units of character information is performed many times, the amount of processing for searching increases.

In particular, in the case where a compression code is not assigned to character information of a processing target in the first place, character information matching the character information of the compression target is not found. Nonetheless, if search processing is performed on character information to which a compression code is not assigned, as character information matching the character information of the compression target is not found, matching will be performed many times, whereby the processing amount of search processing increases.

SUMMARY

According to an aspect of an embodiment, a non-transitory computer-readable recording medium has stored therein a program for causing a computer to execute a process. The process includes: when obtaining a character string including one unit of character information at one position in the character string, referring to presence/absence information indicating whether or not at least one character string, in a character string group including a plurality of character strings to which compression codes have been assigned, includes the one unit of character information at the one position; and searching the character string group for the obtained character string except for a case that the presence/absence information indicates that none of the character strings included in the character string group include the one unit of character information at the one position.

According to another aspect of an embodiment, a non-transitory computer-readable recording medium has stored therein a program for causing a computer to execute a process. The process includes: when obtaining a code string including one unit of code information at one position in the code string, referring to presence/absence information indicating whether or not at least one code string, in a code string group including a plurality of code strings to which conversion codes have been assigned, includes the one unit of code information at the one position; and searching the code string group for the obtained code string except for a case that the presence/absence information indicates that none of the code strings, included in the code string group, include the one unit of code information at the one position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an example of a presence/absence information table according to an embodiment;

DESCRIPTION OF EMBODIMENTS

Preferred embodiments of the present invention will be explained with reference to accompanying drawings.

Figure 1:
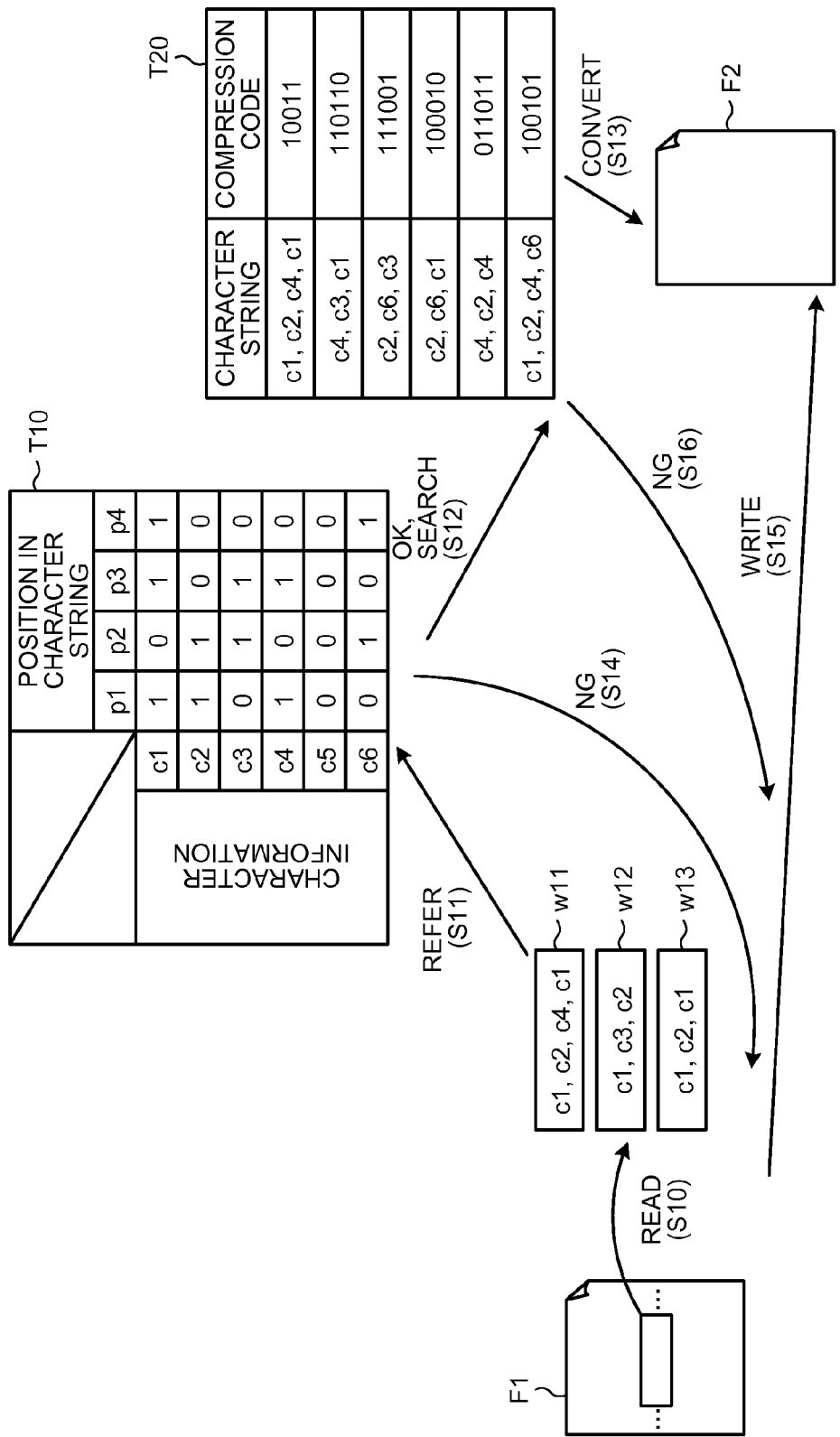
FIG. 1 illustrates an example of conversion processing.

FIG. 1 illustrates exemplary conversion processing. Data included in a file F1 of a compression target is converted to compressed data, and a compressed file F2 is generated using the converted data. In the example of FIG. 1, the file F1 of the compression target includes character strings w11 to w13.

The character strings w11 to w13 are examples of data included in the file F1 of the compression target. In the file F1 of the compression target, another character string may also be included. Each of the character strings w11 to w13 is character information constituting a unit such as a word, a clause, or the like including one or more characters, for example. Each of the character strings w11 to w13 may also be information such as a code, a tag, or the like, used in a system. The length of the character strings w11 to w13 may be a fixed length or a variable length.

The conversion processing of FIG. 1 is performed using a presence/absence information table T10 and a compression dictionary table T20. The compression dictionary table T20 illustrates a correspondence relationship between a character string and a compression code. In the compression dictionary table T20, one or more character strings are stored. Similarly to the character strings w11 to 13, each of the character strings stored in the compression dictionary table T20 is character information constituting a unit such as a word, a clause, or the like including one or more characters, or information such as a code, a tag, or the like, used in a system, for example. To each of the character strings stored in the compression dictionary table T20, a compression code is assigned. Each of c1 to c6 in the character string field of the compression dictionary table T20 is character information. The units of character information c1 to c6 are examples of character information, and other character information may be included in either the compression dictionary tablet T20 or the presence/absence information table T10. As character information, a character code representing one or a plurality of characters (including signs) in a given character code system is used, for example. It may be part of a character code, or part of a code used in the system as character information. The character string stored in the compression dictionary table T20 is a combination of the units of character information c1 to c6.

A character string configured of a combination of the units of character information c1 to c6 is illustrated as an example. For example, if c1 is "a", c2 is "b", c4 is "l", and c6 is "e", a character string c1, c2, c4, and c6 is "able". Further, a character string may be configured by combining two or more types of character information in a partially overlapped manner. For example, if c1 is "ab", c2 is "bo", c4 is "or", and c6 is "rt", a character string c1, c2, c4, and c6 is "abort".

To each of the character strings stored in the compression dictionary table T20, a compression code is assigned. For example, a compression code may be assigned to each character string in advance, or may be one generated by a compression algorithm of Huffman coding or LZ78, or the like.

The presence/absence information table T10 is a map of presence/absence information illustrating whether or not the respective units of character information c1 to c6, stored in the presence/absence information table T10, appear in the character strings stored in the compression dictionary table T20, at respective positions p1 to p4 in the character strings. Similarly to the character information stored in the compression dictionary table T20, the character information stored in the presence/absence information table T10 is a combination of character codes, part thereof, or part of a code used in the system. For example, the respective positions p1 to p4 in a character string indicates the chronological order of the character in a character string. In that case, as an example, the position p1 indicates "the first character, the position p2 indicates "the second character, the position p3 indicates "the third character", the position p4 indicates "the fourth character", and the like. Further, the respective positions p1 to p4 may indicate a range of the chronological orders in a character string. In that case, as an example, the position p1 indicates "the first to second characters", the position p2 indicates "the second to third characters", the position p3 indicates "the third to fourth characters", the position p4 indicates "the fourth to fifth characters", and the like. As another example, it is also possible that the position p1 indicates "the first to third characters", the position p2 indicates "the second to fourth characters", the position p3 indicates "the third to fifth characters", and the position p4 indicates "the fourth to sixth characters". While the number of fields indicating the positions is four in the presence/absence information table T10 illustrated in FIG. 1, it is not limited to this. The number of fields indicating the positions is one or more.

The presence/absence information table T10 is generated based on the character strings stored in the compression dictionary table T20. Regarding each of the character strings illustrated in the compression dictionary table T20, the character information in the character string and the appearing position in the character string are reflected in the presence/absence information table T10. For example, it is assumed that a character string c1, c2, c4, and c6 stored in the compression dictionary table T20 includes the character information c1 at the position p1, the character information c2 at the position p2, the character information c4 at the position p3, and the character information c6 at the positon p4. In that case, from the character string c1, c2, c4, and c6, all of presence/absence information of the character information c1 and the position p1, presence/absence information of the character information c2 and the position p2, presence/absence information of the character information c4 and the position p3, and presence/absence information of the character information c6 and the position p4, in the presence/absence information table T10, represent "presence". Further, in the compression dictionary table T20 illustrated in FIG. 1, when a character string having the character information c1 at the position p3 is not included, the corresponding position in the presence/absence information table T10 represents "absence". The presence/absence information table T10 in FIG. 1 represents "presence" with "1" and "absence" with "0".

The conversion processing illustrated in FIG. 1 is an example of processing to convert the character strings w11 to w13 included in the file F1 of the compression target, into compression codes based on the correspondence relationship illustrated in the compression dictionary table T20. When the character string w11 is read from the file F1 of the compression target (step S10), reference to the presence/absence information table T10 based on the character string w11 is performed (step S11). The character string w11 is a character string including the character information c1 at the position p1, the character information c2 at the position p2, the character information c4 at the position p3, and the character information c1 at the position p4. Regarding all combinations between the character information and the positions included in the character string w11, "presence" is indicated in the presence/absence information table T10. In this case, it is determined that there is a possibility that the character string w11 is registered in the compression dictionary table T20.

If there is a possibility that the read character string w11 is registered in the compression dictionary table T20, the compression dictionary table T20 is searched for the character string w11 (step S12). In the search at step S12, if a character string matching the character string w11 is found in the compression table T20, the character string w11 is converted to a compression code associated with the character string obtained through the search (step S13). For example, in the compression dictionary table T20 illustrated in FIG. 1, the compression code associated with the character string matching the character string w11 is "10011". Conversion at step S13 is performed by reading the compression code from the compression dictionary table T20, and writing it into a storage region provided for generating a compressed file in the memory, and the like.

For example, it is assumed that the character string w12 is read by the readout at step S10. In that case, in the reference at step S11, regarding both combinations of the position p1 and the character information c1 and the position p2 and the character information c3, "presence" is indicated according to the presence/absence information table T10. On the other hand, regarding a combination of the position p3 and the character information c2, "absence" is indicated according to the presence/absence information table T10. As the character string w12 includes, in the character string, at least one combination of character information and a position for which "absence" is indicated in the presence/absence information table T10, it is determined not to be included in the compression dictionary table T20 (step S14). When determination at step S14 is performed, the data itself of the character string w12 is written in the storage region provided for generating a compressed file, or is written by performing other compression processing (step S15).

For example, it is assumed that the character string w13 is read by the readout at step S10. In that case, in the reference at step S11, regarding all of the position p1 and the character information c1, the position p2 and the character information c2, and the position p3 and the character information c1, "presence" is indicated in the presence/absence information table T10. Although the search of step S12 is performed, a character string matching the character string w13 is not included in the compression dictionary table T20 illustrated in FIG. 1 (step S16). In that case, the same processing as that performed in the case of being determined to be step S14 is performed on the character string w13.

In the conversion processing described above, by the determination based on the result of referring to the presence/absence information table T10, part of the processing to search the compression dictionary table T20 is suppressed. As such, the processing cost (processing time, and the like) for compression processing is reduced. Consequently, the processing speed of the entire compression processing is improved.

Figure 2:
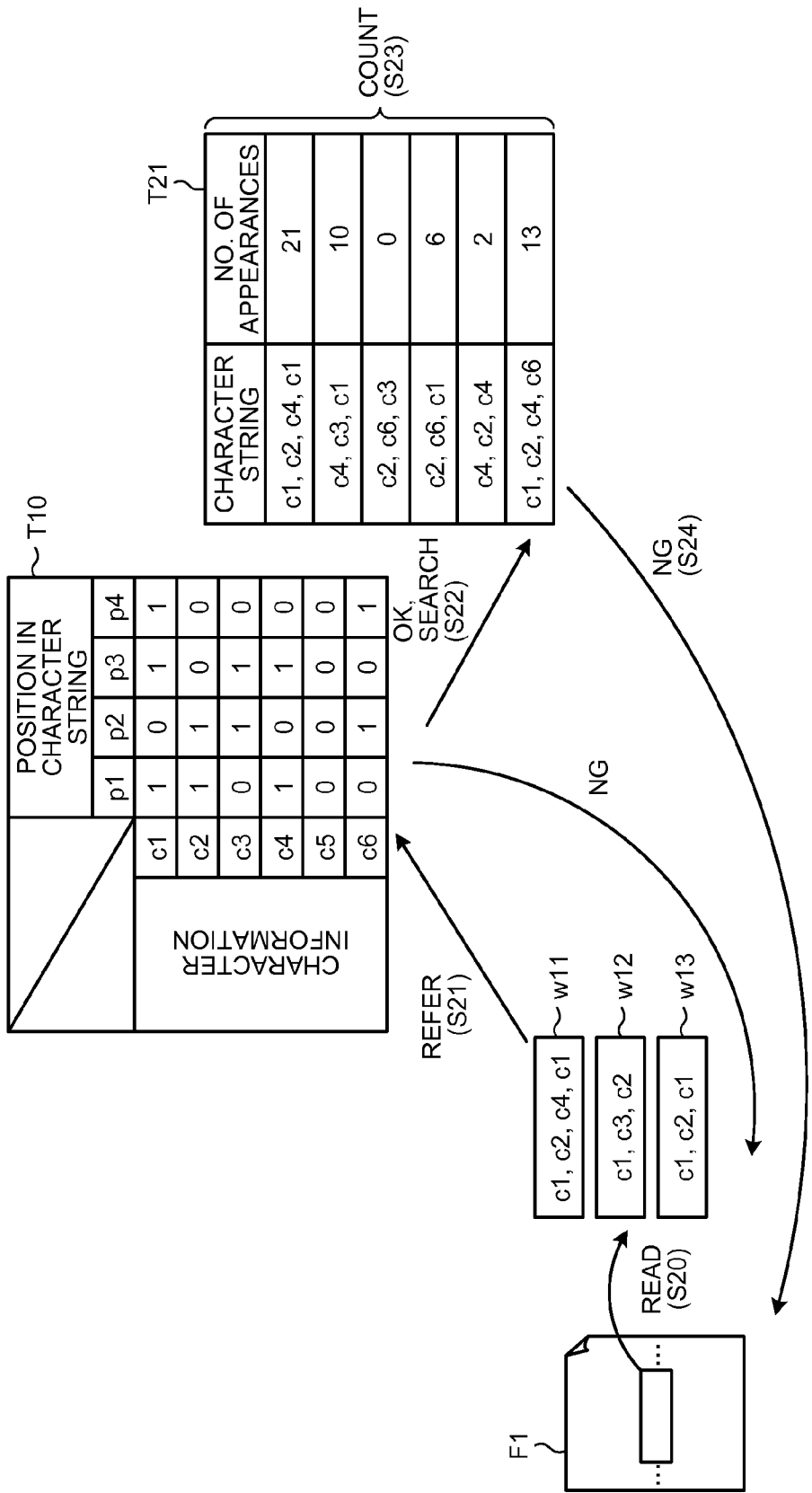
FIG. 2 illustrates an example of tabulation processing.

FIG. 2 illustrates an example of tabulation processing. By the tabulation processing illustrated in FIG. 2, the number of appearances of each character string included in the file F1 of the compression target is added up. In the tabulation processing, the presence/absence information table T10 and a tabulation table T21 are used, for example. The tabulation table T21 is a table associating a character string and the appearance frequency of the character string in the file F1 of the compression target. The tabulation table T21 illustrated in FIG. 2 includes the character strings which are the same as those in the compression dictionary table T20 illustrated in FIG. 1.

When a character string (for example, any of the character strings w11 to w13) is read from the file F1 of the compression target (step S20), based on the read character string, the presence/absence information table T10 is referred to (step S21). As a result of reference at step S21, regarding the character string w11 and the character string w13, "presence" is indicated in the presence/absence information table T10 as for all combinations of the positions included in the character string and the character information. In that case, search of the tabulation table T21 is performed (step S22). When a search is performed for the character string w11, as a character string matching the character string w11 is included in the tabulation table T21, the number of appearances corresponding to the character found by the search is incremented (step S23). On the other hand, as a character string matching the character string w13 is not included in the tabulation table T21, update of the tabulation table T21 is not performed (step S24). Further, regarding the character string w12, as "absence" is indicated by the presence/absence information table T10, a search of the tabulation table is not performed.

In the tabulation processing described above, according to the determination based on the result of reference to the presence/absence information table T10, part of the processing to search the tabulation table T21 is suppressed. As such, the processing cost (processing time and the like) for the tabulation processing is reduced.

Further, based on the number of appearances of each character string in the file F1 of the compression target obtained by the tabulation processing described above, a compression code is assigned to each character string, for example. The compression dictionary table T20 used for the conversion processing of FIG. 1 may be one generated based on the result of tabulation processing illustrated in FIG. 2, or one generated by another method. Further, the compression dictionary table T20 generated based on the result of tabulation processing of FIG. 2 may be used for the conversion processing of FIG. 1, or used for conversion processing by a method other than the conversion processing illustrated in FIG. 1.

The processing illustrated in FIGS. 1 and 2 is realized by a computer having a processor and a memory. The file F1 of the compression target, the compressed file F2, the presence/absence information table T10, the compression dictionary table T20, the tabulation table T21, and the like are developed on the memory. The processor performs operation and accessing to the memory in the procedure illustrated in FIG. 1 or 2, and performs conversion processing illustrated in FIG. 1 and tabulation processing illustrated in FIG. 2. Details of the configuration and the execution procedure of the computer will be described below.

Figure 3:
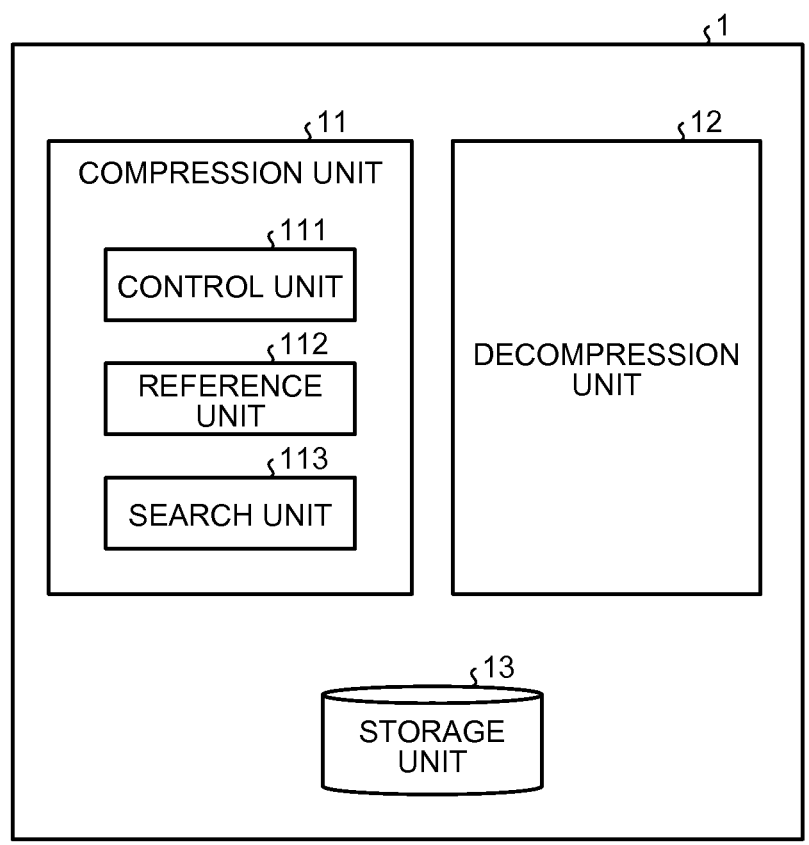
FIG. 3 illustrates an exemplary configuration of function blocks of a computer according to an embodiment.

FIG. 3 illustrates an exemplary configuration of functional blocks of a computer 1. The computer 1 includes a compression unit 11, a decompression unit 12, and a storage unit 13. The storage unit 13 stores a file of a compression target (for example, the file F1 illustrated in FIG. 1 and FIG. 2), a compression file (for example, the compressed file F2 illustrated in FIG. 1), and the like. The storage unit 13 also stores a presence/absence information table (the presence/absence information table T10 illustrated in FIG. 1 and FIG. 2, and the like), a compression dictionary table (the compression dictionary table T20 illustrated in FIG. 1, and the like), and a tabulation table (the tabulation table T21 illustrated in FIG. 2, and the like). As for any of the presence/absence information table, the compression dictionary table, and the tabulation table, variations of the contents described above relating to FIG. 1 and FIG. 2 may be made.

The compression unit 11 performs compression processing of a data file of a compression target stored in the storage unit 13. For example, the compression unit 11 performs processing illustrated in FIG. 1 and FIG. 2. The decompression unit 12 performs decompression processing of a compressed file stored in the storage unit 13. This means that the decompression unit 12 reads a compressed file from the storage unit 13, sequentially converts the compression codes included in the read compressed file into decompressed data, sequentially stores the decompressed data obtained by the conversion in the storage unit 13, and generates a decompressed file.

The compression unit 11 includes a control unit 111, a reference unit 112, and a search unit 113. The control unit 111 controls the reference unit 112 and the search unit 113 in compression processing. The control unit 111 uses the functions of the reference unit 112 and the search unit 113 to thereby perform generation processing of a presence/absence information table, tabulation processing of character strings included in a file of a compression target, generation processing of a compression dictionary based on the tabulation result, conversion processing from a character string included in a file of a compression target to a compression code, and the like, for example. Details of the respective kinds of processing will be described below based on a flowchart.

The reference unit 112 refers to a presence/absence information table stored in the storage unit 13 to thereby determine whether or not there is a possibility that a character string read by the control unit 111 is registered in a compression dictionary table. Alternatively, the reference unit 112 determines whether or not there is a possibility that a character string read by the control unit 111 is registered in a tabulation table. According to the determination result of the reference unit 112, the control unit 111 controls searching performed by the search unit 113. If it is determined by the reference unit 112 that there is a possibility that a read character string is registered in a compression dictionary table, the control unit 111 allows the search unit 113 to perform searching of the compression dictionary table. If it is determined by the reference unit 112 that there is no possibility that a read character string is registered in a compression dictionary table, the control unit 111 does not allow the search unit 113 to perform search processing. This means that the control unit 111 allows the search unit 113 to perform search processing except for the case where it is determined that there is no possibility that a read character string is registered in a compression dictionary table. According to the control by the control unit 111, the search unit 113 searches the compression dictionary table for the character string read by the control unit 111. The control unit 111 also performs similar control according to the determination by the reference unit 112 as for searching of a tabulation table by the search unit 113. According to the processing results of the reference unit 112 and the search unit 113, the control unit 111 further performs processing, the processing contents of which will be described below using a flowchart.

Figure 4:
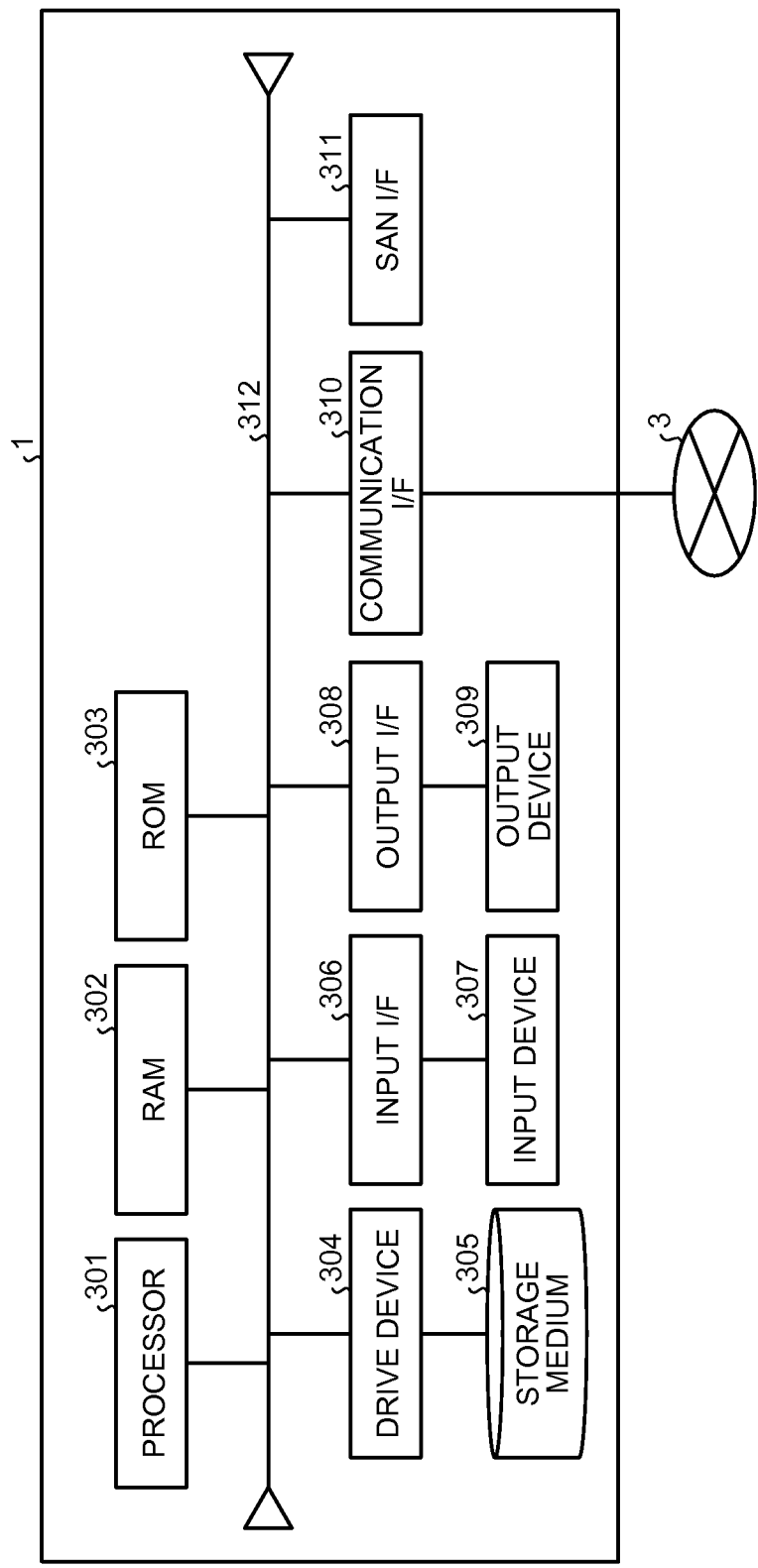
FIG. 4 illustrates an exemplary configuration of hardware of a computer according to an embodiment.

FIG. 4 illustrates an example of a hardware configuration of the computer 1. The computer 1 includes, a processor 301, a RAM (Random Access Memory) 302, a ROM (Read Only Memory) 303, a drive device 304, a storage medium 305, an input interface (I/F) 306, an input device 307, an output interface (I/F) 308, an output device 309, a communication interface (I/F) 310, a SAN (Storage Area Network) interface (I/F) 311, a bus 312, and the like, for example. The respective units of hardware are connected via the bus 312.

The RAM 302 is a readable/writable memory device. For example, a semiconductor memory such as an SRAM (Static RAM), a DRAM (Dynamic RAM), or the like, or a flash memory rather than a RAM, may be used. The ROM 303 includes a PROM (Programmable ROM) or the like. The drive device 304 is a device which performs at least one of reading of information recorded on the storage medium 305 and writing. The storage medium 305 stores information written by the drive device 304. The storage medium 305 may be a hard disk, a flash memory such as an SSD (Solid State Drive), a storage medium such as a CD (Compact Disc), a DVD (Digital Versatile Disc), a Blu-ray disc, or the like, for example. Further, the computer 1 has the drive device 304 and the storage medium 305 for each of a plurality of types of storage media, for example.

The input interface 306 is connected with the input device 307, and transmits an input signal, received from the input device 307, to the processor 301. The output interface 308 is connected with the output device 309, and allows the output device 309 to perform output according to an instruction of the processor 301. The communication interface 310 controls communications over a network 3. The SAN interface 311 controls communications with a storage device connected with the computer 1 over a storage area network.

The input device 307 is a device which transmits an input signal according to an operation. The input device 307 is a key device such as a keyboard, buttons provided on the body of the computer 1, or the like, or a pointing device such as a mouse, a touch panel, or the like, for example. The output device 309 is a device which outputs information according to control of the computer 1. The output device 309 is an image output device (display device) such as a display, or a sound output device such as a speaker, for example. Further, an input/output device such as a touch screen is used as the input device 307 and the output device 309, for example. Further, the input device 307 and the output device 309 may be integrated with the computer 1, or may be a device which is not included in the computer 1 and is connected with the computer 1 from the outside.

For example, the processor 301 reads a program stored in the ROM 303 or the storage medium 305 to the RAM 302, and in accordance with the procedure of the read program, performs processing of the compression unit 11 or processing of the decompression unit 12. At that time, the RAM 302 is used as a work area of the processor 301. The function of the storage unit 13 is realized by storing a program file (an application program 24, middleware 23, OS 22 or the like described below) or a data file (data file of a compression target, compressed file, data file of an decompression target, decompressed file, or the like) by the ROM 303 and the storage medium 305, and using the RAM 302 as a work area of the processor 301. A program read by the processor 301 will be described using FIG. 5.

Figure 5:
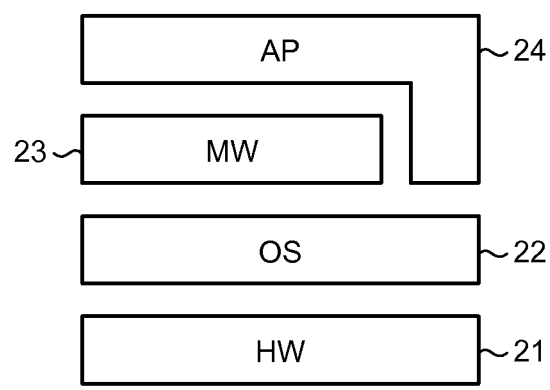
FIG. 5 illustrates an exemplary configuration of programs of a computer according to an embodiment.

FIG. 5 illustrates an exemplary configuration of a program of the computer 1. In the computer 1, an operation system (OS) 22, which controls a hardware group (HW) 21 illustrated in FIG. 4, operates. The processor 301 operates in the procedure according to the OS 22 to thereby control and manage the hardware group 21, which allows processing according to the application program (AP) 24 and the middleware (MW) 23 to be executed by the hardware group 21. Further, in the computer 1, the middleware 23 or the application program 24 are read by the RAM 302 and executed by the processor 301.

By performing, by the processor 301, processing based on the compression function included in the middleware 23 or the application program 24, the function of the compression unit 11 is realized (by controlling the hardware group 21 based on the OS 22 for the processing). Further, by performing, by the processor 301, processing based on the decompression function included in the middleware 23 or the application program 24, the function of the decompression unit 12 is realized (by controlling the hardware group 21 based on the OS 22 for the processing). The compression function and the decompression function may be defined in the application program 24 itself, respectively, or may be functions of the middleware 23 which are performed by being called in accordance with the application program 24.

With execution of the application program 24 (or the middleware 23), in the compression function to be realized, processing to search the compression dictionary table is performed except that it is determined that there is no possibility that the read character string is registered in the compression dictionary table. This means that in compression processing, as an access to the compression dictionary table stored in a memory such as the RAM 302, for example, is prevented in a particular case, the number of access times to the memory and the number of times of matching processing regarding information read from the memory by the processor 301 are decreased.

Figure 6:
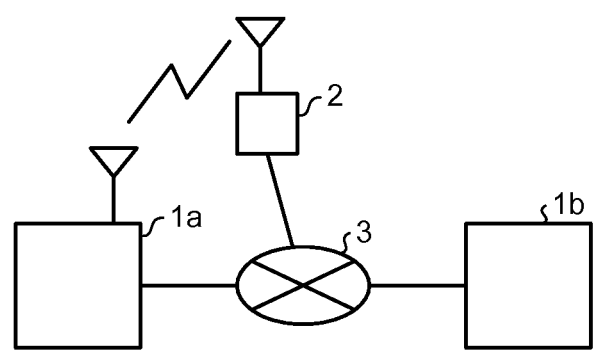
FIG. 6 illustrates an exemplary configuration of devices in a system of an embodiment.

FIG. 6 illustrates an exemplary configuration of a device according to the system of the present embodiment. The system of FIG. 6 includes a computer 1a, a computer 1b, a base station 2, and a network 3. The computer 1a is connected with the network 3 connected with the computer 1b, in at least one of wireless and wired manners.

The compression unit 11 and the decompression unit 12 illustrated in FIG. 3 may be included in either the computer 1a or the computer 1b illustrated in FIG. 6. It is possible that the computer 1a includes the compression unit 11 illustrated in FIG. 3 and the computer 1b includes the decompression unit 12, or that the computer 1b includes the compression unit 11 included in FIG. 3 and the computer 1a includes the decompression unit 12. Alternatively, it is also possible that both the computer 1a and the computer 1b include the compression unit 11 and the decompression unit 12.

Hereinafter, processing procedure will be described.

Figure 7:
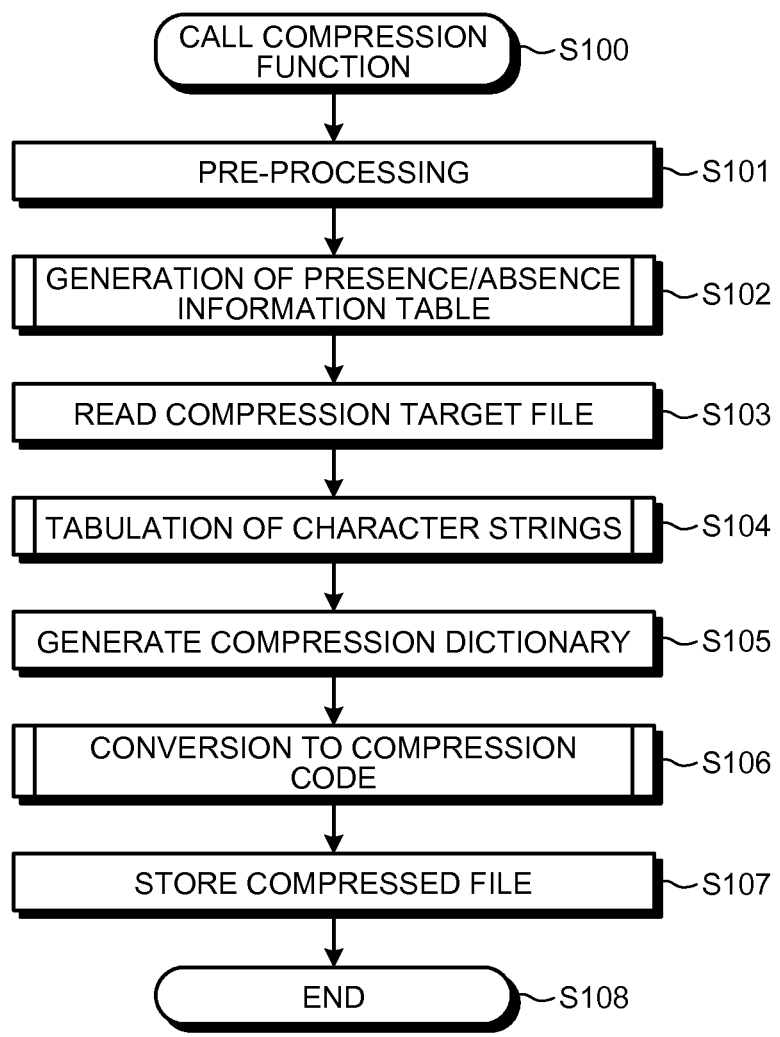
FIG. 7 illustrates an exemplary procedure of compression processing according to an embodiment.

FIG. 7 illustrates an exemplary procedure of compression processing. When the compression function of the application program 24 is called by an input by an operator or an instruction by the application program 24 (step S100), pre-processing of the compression function is performed (step S101). In the processing of step S101, the compression unit 11 reads a list of character strings to which compression codes are assigned, from the storage unit 13 to a work area.

The list of character strings includes a plurality of character strings such as words and clauses. It is possible that a plurality of lists of character strings are stored in the storage unit 13 and that any of them is selected by an instruction. In that case, for example, a character string list specialized in a field, to which a file of a compression target belongs, is prepared. For example, as for computer-related book data, compression is performed using a character string list including computer terms in a larger number than other character string lists. Further, words and clauses included in a character string list are selected based on a dictionary, for example. For example, a character string list including words appeared in a dictionary of computer terms, a character string list including words appeared in a dictionary of chemical terms, and the like are generated.

Figure 8:
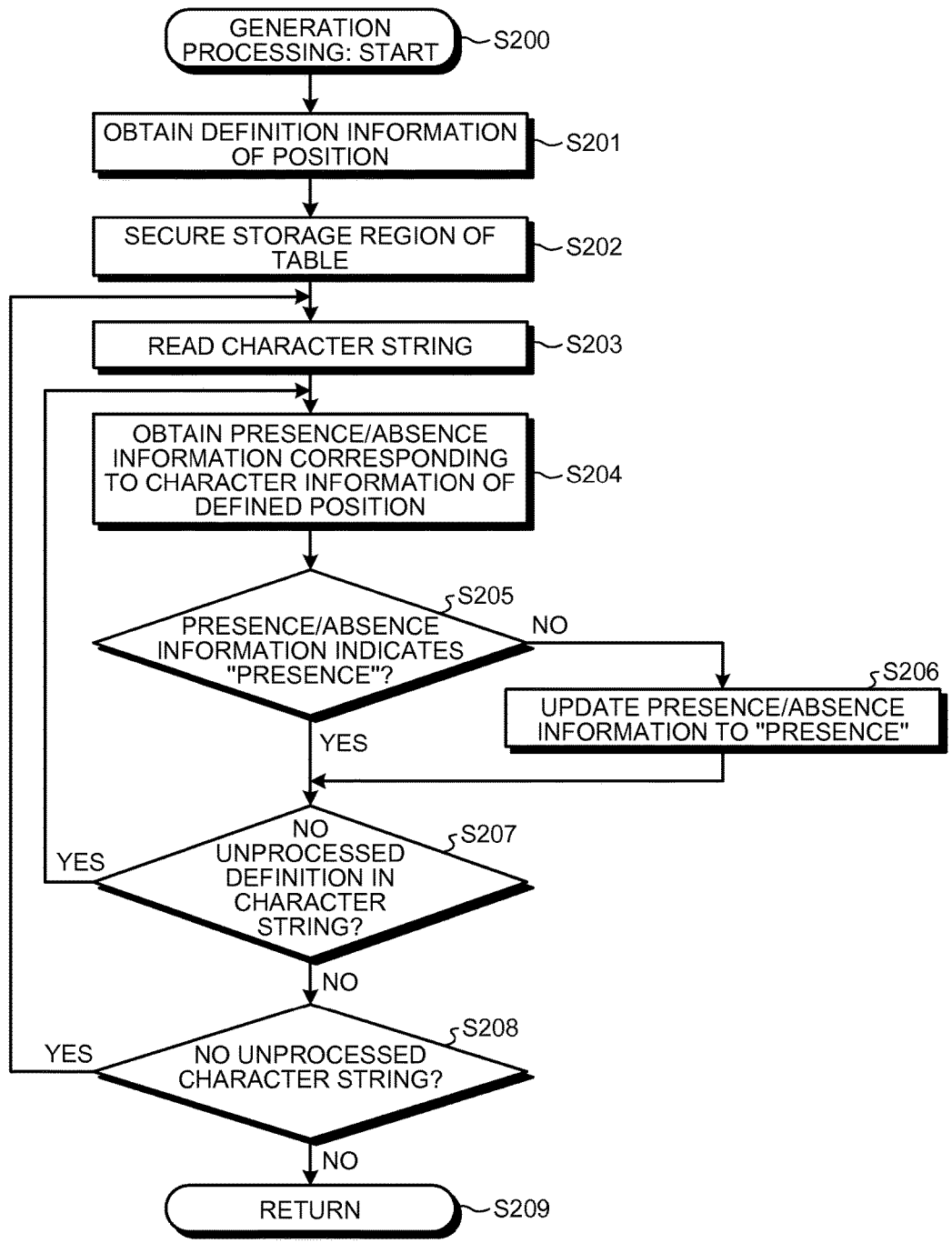
FIG. 8 illustrates an exemplary procedure of presence/absence information table generation processing according to an embodiment.

When a character string list is read to the work area, the control unit 111 generates a presence/absence information table (step S102). As exemplarily illustrated in the presence/absence information table T10 of FIG. 1 and FIG. 2, the presence/absence information table represents, for a character string in the character string list, whether or not each unit of character information appears at a particular position in the character string. Character information and a particular position in the character string are set based on a predetermined definition, for example. FIG. 8 illustrates an exemplary procedure of processing to generate a presence/absence information table.

When processing to generate a presence/absence information table is called (step S200), the control unit 111 reads definition information regarding the position in the character string (step S201). The definition information includes a definition designating the number of characters (length of the character information) from the place of the character (start position) in the character string, for example. According to an exemplary definition, "one character" from "the first character" is designated. The definition information includes one or more definitions. As an exemplary definition information, definition information including a definition designating "two characters" from "the first character", a definition designating "two characters" from "the second character", a definition designating "two characters" from "the third character", and a definition designating "two characters" from "the fourth characters" may be used. Further, designation of the start position and the length of character information, included in each definition, is set by either a counting method from the top or a counting method from the end of the character string.

Next, the control unit 111 secures a storage region for storing the presence/absence information table in the storage unit 13 (step S202). In the processing of step S202, the control unit 111 further initially sets presence/absence information included in the presence/absence information table to information indicating "absence".

The presence/absence information table has a field corresponding to each definition included in the definition information obtained at step S201, for example. As such, for example, the presence/absence information table has fields of at least the number of the definitions included in the definition information. As each field indicates information of "presence" or "absence", data of one bit or larger is included (for example, each field includes one bit, "1" represents "presence", and "0" represents "absence"). Further, for example, the presence/absence information table has records of at least the number of types of character information. The number of types of character information is set according to the number of types of character codes included in the character code system used, and the length of the character information defined in the definition information obtained at step S201, for example. The number of types of character information is the number calculated by exponentiating the number of types of character codes included in the character code system with the length of the character information defined. Further, regarding each record corresponding to each unit of character information, the start position thereof is indicated by the character information itself, for example.

The size of the presence/absence information table and the start position of a record corresponding to character information will be described using the ASCII code system as an example. Each character code of the ASCII code system is expressed in one byte. In the definition information, if the length of character information is defined in "two characters", the character information is expressed in two bytes. As an example, if a region of one byte is secured for each record, the start position of a record of presence/absence information for character information expressed in two bytes is specified by a numeric value corresponding to character information in two bites from the start position of the presence/absence information table. For example, an ASCII code corresponding to character information of "AA" is 0x4141, which is "16705" in a decimal number. As such, it is specified that the start position of a record of presence/absence information regarding the character information "AA" is a position at 16705 bytes from the start position of the presence/absence information table. In the example described above, while the size of each record is one byte, if it is one byte, it is possible to handle even if eight definitions are included in definition information. Further, the size of the presence/absence information table in the example described above is stored in a storage region of the sixteenth power of two bytes (=64 KB). However, in the ASCII code system, only from 0x00 to 0x7F are used, and character codes corresponding to 0x80 to 0xFF are not used. In practice, in the example described above, 16 KB, which is a quarter of 64 KB, is enough for the storage region used by the presence/absence information table.

For example, in definition information, if the length of character information in the respective definitions is designated as "two characters" and it is designated as "the first character", "the second character", "the third character", "the fourth character", and "the fifth character" in the respective definitions, the presence/absence information table becomes a presence/absence information table T11 illustrated in FIG. 9. However, in the presence/absence information table T11 illustrated in FIG. 9, the characters constituting the character information are exemplarily limited to alphabetical lower-case characters. The presence/absence information table T11 has fields corresponding to positions in the character string such as "the first to second characters", "the second to third characters", "the third to fourth characters", "the fourth to fifth characters", "the fifth to sixth characters", and the like. Further, the presence/absence information table T11 has records storing presence/absence information for respective combinations of two characters of alphabetical lower-case characters.

When the storage region of the presence/absence information table is secured in the processing at step S202, the control unit 111 sequentially reads character strings from the character string list read to the work area at step S102 of FIG. 7 (step S203). Upon execution of the processing of step S203, the control unit 111 allows the reference unit 112 to perform reference processing of the presence/absence information table. The reference unit 112 selects a definition not having been processed among the definitions obtained at step S202, and using the selected definition, refers to the presence/absence information table to obtain presence/absence information (step S204). The reference unit 112 obtains presence/absence information of character information located at a position indicated by the selected definition, within the character string read at step S203. The reference unit 112 determines whether the obtained presence/absence information represents "presence" (step S205). If the obtained presence/absence information represents "absence" (step S205: NO), the reference unit 112 updates the presence/absence information of the corresponding location in the presence/absence information table to "presence" (step S206). If the presence/absence information obtained at step S204 represents "presence" (step S205: YES) or processing of step S206 is performed, it is determined whether or not there is an unprocessed definition (step S207). If there is an unprocessed definition in the determination of step S207 (step S207: YES), the processing of step S204 is performed again based on the unprocessed definition.

An example will be given using the presence/absence information table T11. For example, assuming that a character string "able" is read at step S203, at step S204, presence/absence information is obtained based on character information of any of "ab", "b1", and "1e" according to the selection based on the definition information. For example, in the case of obtaining presence/absence information regarding character information "ab" from the presence/absence information table of FIG. 9, information "1" is read from the field of "the first to second" characters of the record of the character information "ab". In this case, in the determination at step S205, it is determined that "presence" is indicated.

When reference processing, using each definition included in the definition information, is performed on the character string read at step S203 (step S207: NO), the control unit 111 determines whether or not there is an unprocessed character string in the character string list (step S208). In the determination at step S208, if there is an unprocessed character string (step S208: YES), the control unit 111 returns to step S203, and performs readout of the unprocessed character string again. In the determination at step S208, if there is no unprocessed character string (step S208: NO), the processing is returned to the flow of FIG. 7 (step S209).

When returning to the processing of FIG. 7, the control unit 111 reads a file of the compression target to the work area (step S103). If the size of the file of the compression target is too large to be read to the work area, the control unit 111 performs processing of step S103 to step S107 in block units obtained by dividing the file of the compression target into blocks. Next, the control unit 111 performs tabulation processing of the character strings included in the data read in the processing of step S103 (step S104).

Figure 10:
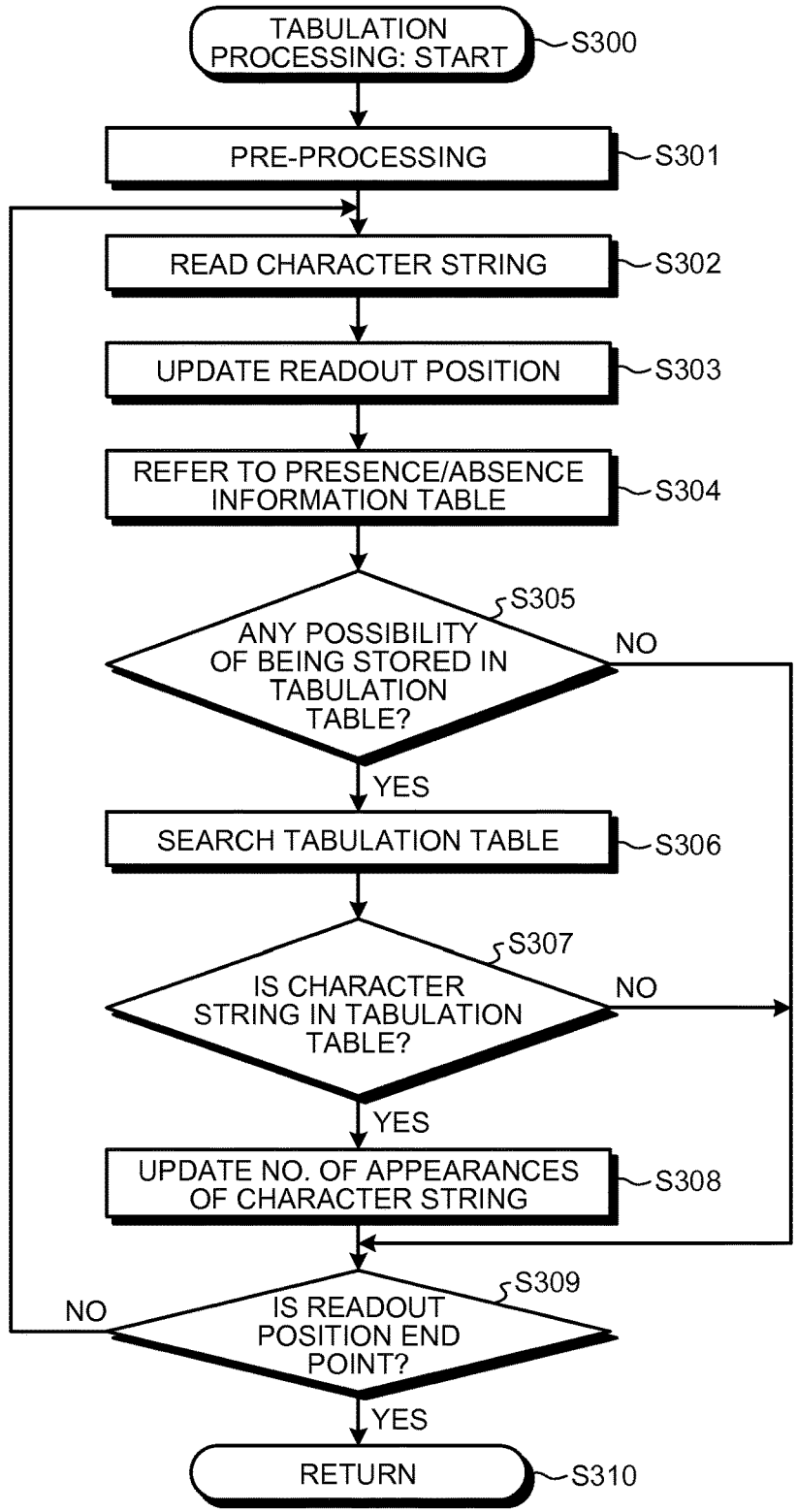
FIG. 10 illustrates an exemplary procedure of character string tabulation processing according to an embodiment.

FIG. 10 illustrates an exemplary procedure of tabulation processing of character strings. When tabulation processing starts (step S300), pre-processing is performed by the control unit 111 (step S301). In the processing of step S301, the control unit 111 secures a storage region of a tabulation table in the storage unit 13. The tabulation table includes, for example, a plurality of character strings and information regarding the number of appearances associated with each of the character strings, as in the tabulation table T21 illustrated in FIG. 2. In the processing of step S301, the control unit 111 stores the character strings included in the character string list, in the tabulation table.

Next, the control unit 111 sequentially reads the character strings from the file of the compression target read to the work area (step S302). A unit of reading at step S302 is determined according to the setting. For example, regarding a file including an English sentence and the like, reading is performed by dividing a character string at a position where a space appears. Further, regarding a file including a Japanese sentence and the like, for example, reading is performed by dividing it by clauses or words through text analysis. In the text analysis, a break in language units, which is specific to the language, is used. For example, description suggesting a break of a clause such as "~ is", "~ to", "not ~", "from ~" or the like is detected through text analysis, and reading is performed in units divided according to the detection, as a character string.

When the character string is read in the processing of step S302, the control unit 111 updates the reading position of a character string used in step S302 according to the length of the read character string (step S303). Next, the reference unit 112 refers to the presence/absence information table based on the character string read at step S302 (step S304), and determines whether or not there is a possibility that the character string read at step S302 is stored in the tabulation table (step S305). Reference to the presence/absence information table is performed based on the position in the character string defined in the definition information. The reference unit 112 takes out character information located at the position defined in the definition information, in the character string read at step S302, and reads the taken character information and presence/absence information corresponding to the defined position in the presence/absence information table. Readout of the presence/absence information is performed on each unit of character information obtained from the character string. In the determination at step S305, if all units of the presence/absence information obtained by the reference at step S304 indicate "presence", the reference unit 112 determines that there is a possibility that the character string read at step S302 is stored in the tabulation table. Meanwhile, if at least one unit of the presence/absence information obtained by the reference at step S304 indicates "absence", it is determined that there is no possibility that the character string read at step S302 is stored in the tabulation table.

The processing of step S304 and step S305 will be exemplified based on the presence/absence information table T11 illustrated in FIG. 9. For example, it is assumed that a character string read at step S302 is "about". According to the definition information in the presence/absence information table T11, the character string "about" includes four sets of character information and a position in the character string. A first set includes character information "ab" and a position "the first to second characters". A second set includes character information "bo" and a position "the second to third characters". A third set includes character information "ou" and a position "the third to fourth characters". A fourth set includes character information "ut" and a position "the fourth to fifth characters". In the processing at step S304, the reference unit 112 refers to the presence/absence information table T11 for each of the first to fourth sets, and obtains presence/absence information. Every presence/absence information obtained for all of the first to fourth sets is "1", which indicates "presence". As every presence/absence information obtained by reference indicates "presence", the reference unit 112 determines that there is a possibility that the character string "about" is stored in the tabulation table.

Further, regarding the processing of step S304 and step S305, another example will be illustrated. For example, it is assumed that a character string read at step S302 is "abort". According to the definition information in the presence/absence information table T11, the character string "abort" includes four sets of character information and a position in the character string. A first set includes character information "ab" and a position "the first to second characters". A second set includes character information "bo" and a position "the second to third characters". A third set includes character information "or" and a position "the third to fourth characters". A fourth sect includes character information "rt" and a position "the fourth to fifth characters". In the processing at step S304, the reference unit 112 refers to the presence/absence information table T11 for each of the first to fourth sets, and obtains presence/absence information. While the presence/absence information corresponding to the first set and the second set is "1", the presence/absence information corresponding to the third set and the fourth set is "0" which indicates "absence". As presence/absence information corresponding to one or more sets indicates "absence", the reference unit 112 determines that there is no possibility that the character string "abort" is stored in the tabulation table.

In the determination at step S305, if it is determined that there is a possibility that the character string read at step S302 is stored in the tabulation table (step S305: YES), the search unit 113 searches the tabulation table using the character string read at step S302 (step S306). The search processing at step S306 is performed by sequentially performing comparison and matching between the character string stored in the tabulation table and the character string read at step S302 within the tabulation table, for example. Further, as there is also a search method using an index, such a method will be described below using FIG. 12, for example.

As a result of search processing of step S306, the search unit 113 determines whether or not a corresponding character string (character string matching the character string read at step S302) is found in the tabulation table (step S307). If the search unit 113 finds a character string matching the character string read at step S302 by comparison and matching of character strings, the search unit 113 determines that it was able to find a corresponding character string (step S307: YES). In that case, the control unit 111 updates the number of appearances associated with the corresponding character string in the tabulation table (step S308). Update of the number of appearances is performed by incrementing the numerical value indicating the number of appearances.

When the processing of step S308 ends, if the determination condition of step S305 is not satisfied (step S305: NO) or the determination condition of step S307 is not satisfied (step S307: NO), the control unit 111 determines whether or not the readout position updated at step S303 is the end point of the file F1 of the compression target (step S309). If the readout position is not the end point yet (step S309: NO), the control unit 111 returns to the flow of step S302, and performs readout of a character string again. If the readout position is the end point of the file F1 of the compression target (step S309: YES), the control unit 111 returns to the flow of FIG. 7 (step S310).

Upon execution of the processing of step S104, the number of appearances of each character string in the file of the compression target is counted in the tabulation table. After the processing of step S104, the control unit 111 assigns a compression code to each character string according to the number of appearances of each character string, and generates a compression dictionary table (step S105). Similarly to the compression dictionary table T20 illustrated in FIG. 1, the compression dictionary table is a table in which a character string and a compression code are associated. Assignment of a compression code according to the number of appearances of each character string is assigned according to a Huffman tree generation algorithm of Huffman encoding or a compression code generation algorithm of arithmetic compression. In the Huffman tree generation algorithm of Huffman encoding, codes are assigned according to the sequence of the number of appearances of a character string included in the tabulation table. To a character string having a larger number of appearances, a shorter compression code is assigned. Further, in the arithmetic compression, a compression code of a length corresponding to the appearance probability of each character string is assigned. Even in the arithmetic compression, as an appearance probability is larger (the number of appearances is larger), a shorter compression code is assigned. The control unit 111 stores the generated compression code in the compression dictionary table in association with each character string.

When the processing of step S104 ends, based on the compression dictionary table generated at step S104, the control unit 111 performs processing to convert the data included in the file of the compression target into compression codes (step S106).

Figure 11:
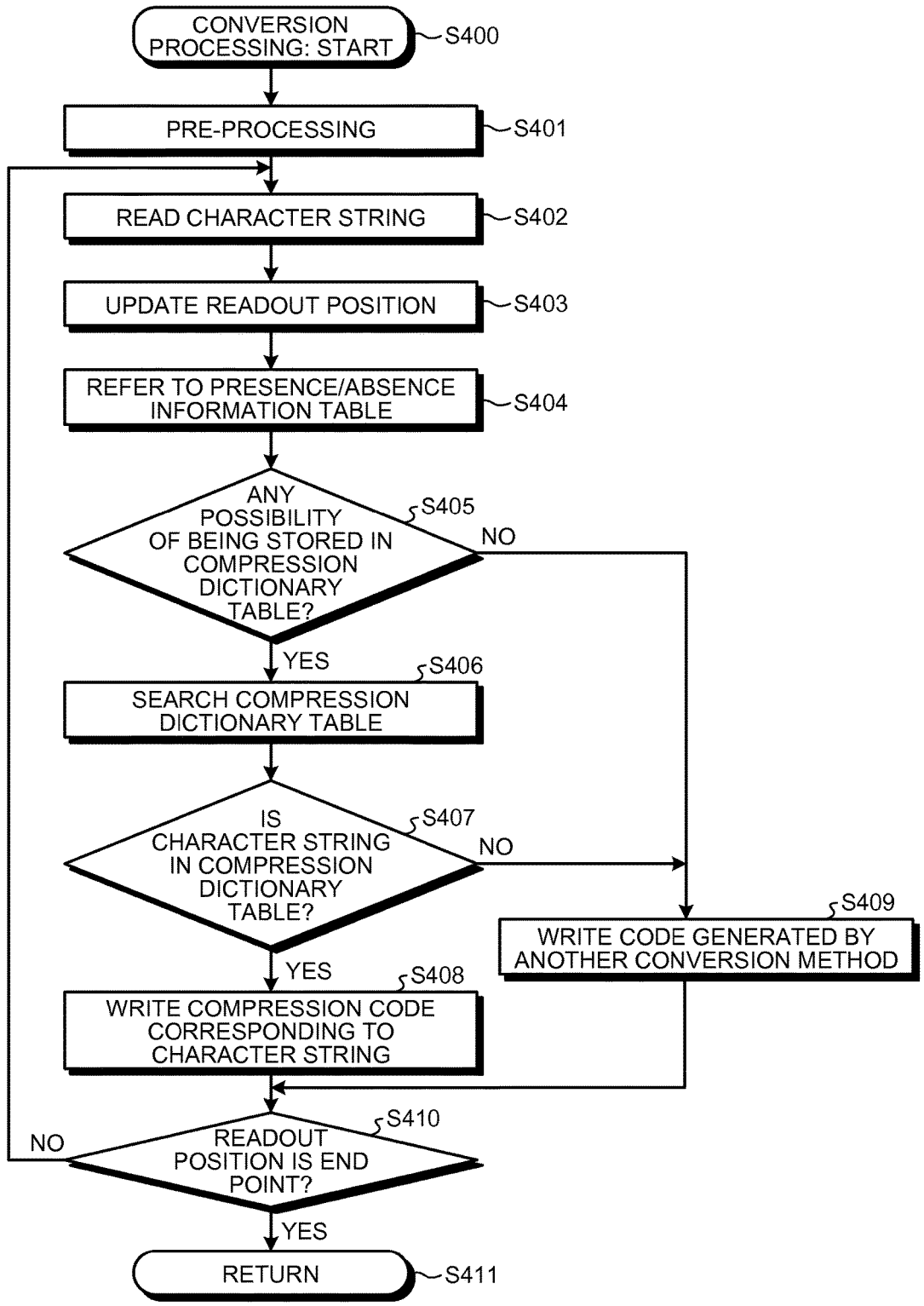
FIG. 11 illustrates an exemplary procedure of conversion processing according to an embodiment.

FIG. 11 illustrates an exemplary procedure of conversion processing. When the conversion processing starts (step S400), pre-processing is performed by the control unit 111 (step S401). In the processing of step S401, the control unit 111 secures a storage region of a compressed file in the storage unit 13.

Next, the control unit 111 sequentially reads the character strings from a file of the compression target read to the work area (step S402). A unit of reading at step S402 is performed in the same unit as that used in step S302. When a character string is read in the processing of step S402, the control unit 111 updates the read position of a character string used in step S402 according to the length of the read character string (step S403). Next, the reference unit 112 refers to the presence/absence information table based on the character string read at step S402 (step S404), and determines whether or not there is a possibility that the character string read at step S402 is stored in the compression dictionary table generated at step S104 (step S405). Reference to the presence/absence information table at step S404 is performed based on the position in the character string defined in the definition information, which is the same as the processing at step S304. Reference to the presence/absence information is performed on each unit of the character information obtained from the character string. In the determination at step S405, if all units of the presence/absence information obtained by the reference at step S404 indicate "presence", the reference unit 112 determines that there is a possibility that the character string read at step S402 is stored in the compression dictionary table. Meanwhile, if at least one unit of the presence/absence information obtained by the reference at step S404 indicates "absence", the reference unit 112 determines that there is no possibility that the character string read at step S402 is stored in the compression dictionary table.

In the determination at step S405, if it is determined that there is a possibility that the character string read at step S402 is stored (step S405: YES), the search unit 113 searches the compression dictionary table using the character string read at step S402 (step S406). The search processing at step S406 is performed by sequentially performing comparison and matching between the character string stored in the compression dictionary table and the character string read at step S402, within the compression dictionary table, for example. Further, as there is also a search method using an index, such a method will be described below using FIG. 13.

As a result of search processing of step S406, the search unit 113 determines whether or not a corresponding character string (character string matching the character string read at step S402) is found in the compression dictionary table (step S407). If the search unit 113 finds a character string matching the character string read at step S402 by comparison and matching of character strings, the search unit 113 determines that it was able to find a corresponding character string (step S407: YES). In that case, the control unit 111 writes the compression code associated with the corresponding character string in the storage region secured at step S401, in the compression dictionary table (step S408).

If the determination condition of step S405 is not satisfied (step S405: NO) or the determination condition of step S407 is not satisfied (step S407: NO), the control unit 111 compresses the character string read at step S402 with another compression algorithm, and stores the compressed data in the storage region secured at step S401 (step S409). Another compression algorithm may be a compression algorithm such as Huffman encoding in which a compression code is assigned on a one-character basis, for example. Further, at step S409, the control unit 111 may directly write the character string, read at step S402, into the storage region secured at step S401.

When the processing of step S408 or the processing of step S409 ends, the control unit 111 determines whether or not the readout position updated at step S403 is the end point of the file F1 of the compression target (step S410). If the readout position is not the end point yet (step S410: NO), the control unit 111 returns to the flow of step S402, and performs readout of a character string again. If the readout position is the end point of the file F1 of the compression target (step S410: YES), the control unit 111 returns to the flow of FIG. 7 (step S411).

Upon execution of the processing of step S106, the control unit 111 saves the compression code group stored in the storage unit 13 as a compressed file (step S107). In the processing of step S107, the control unit 111 allows a screen to be displayed in which a file name and a file storage location are designated, and stores the compressed file with the designated file name at the file storage location designated in the input according to the displayed screen, for example. When the compressed file is saved, the called compression function is closed (step S108).

Next, tabulation table search processing and an example of a compression dictionary table will be described.

Figure 12:
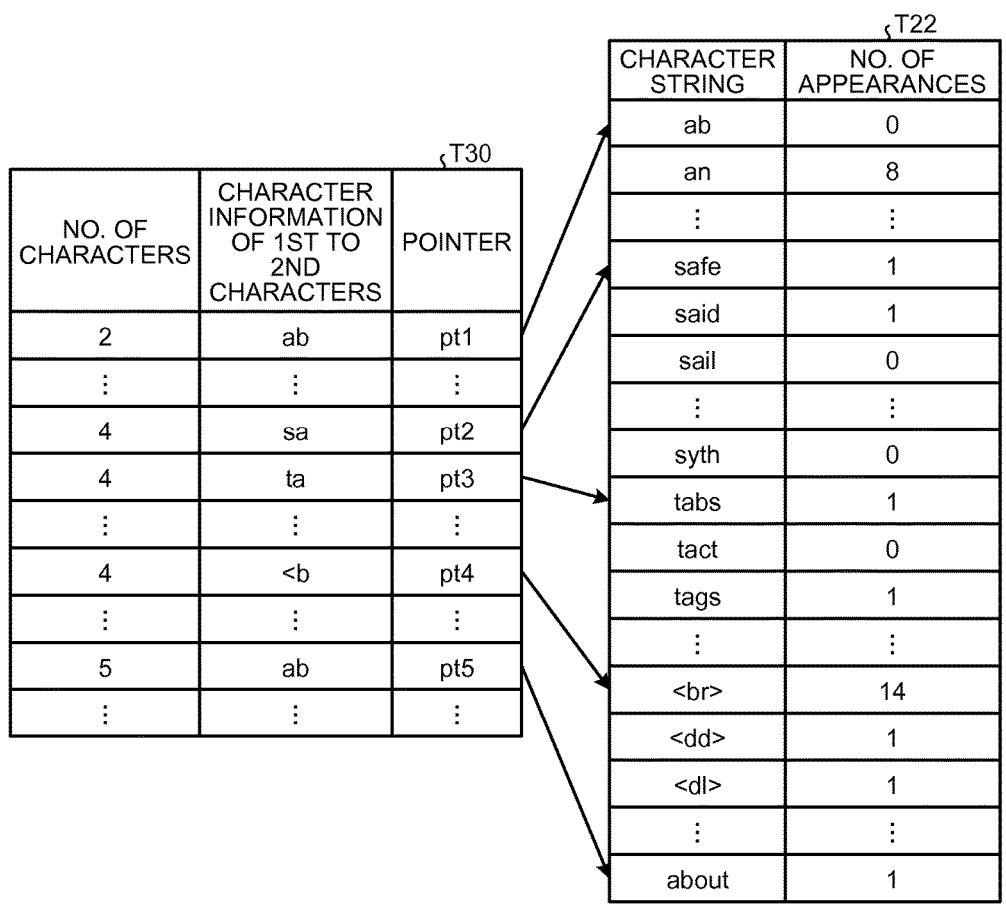
FIG. 12 illustrates an example of a tabulation table and an example of an index corresponding to the tabulation table according to an embodiment.

FIG. 12 illustrates an example of a tabulation table and an example of an index corresponding to the tabulation table. Similarly to the tabulation table T21 illustrated in FIG. 2, a tabulation table T22 illustrates a correspondence relationship between a character string and the number of appearances of the character string. The character strings stored in the tabulation table T22 are stored in the increasing order of the number of characters, and character strings having the same number of characters are stored in the alphabetical order.

An index T30 includes fields storing the number of characters, character information of a given position in a character string, and a pointer. The pointer indicates a stored position in the tabulation table T22 corresponding to two conditions, namely the number of characters and character information at a given position. In the index T30, a given position is the first to second characters from the top in a character string. For example, a pointer pt1 of a record, in which the number of characters of a character string is two and character information of the first to second characters is "ab", indicates a stored position of the character string "ab" in the tabulation table T22. Further, a pointer pt2 of a record, in which the number of characters of a character string is four and character information of the first to second characters is "sa", indicates the stored position of a character string "safe" in the tabulation table T22, for example. Similarly, pt3 to pt5 indicate stored positions of character strings in the tabulation table T22. The respective records included in the index T30 are also stored in the increasing order of the number of characters, and further, those having the same number of characters are stored in the alphabetical order.

The search processing of step S306 in FIG. 10 is performed using the index T30, for example. The search unit 113 refers to a pointer stored in a record in which the number of characters of the character string read at step S302 and character information of the first to second characters of the character string read at step S302 match, in the index T30. For example, if the character string read at step S302 is "said", the search unit 113 searches the tabulation table T22 based on the pointer pt2 stored in the record in which the number of characters is "4" and the first to second characters are "sa". The search procedure will be described in more detail. The search unit 113 reads a character string "safe" from the tabulation table T22 based on the pointer pt2, and compares it with the character string "said" read at step S302. As the character string "safe" does not match the character string "said", the search unit 113 performs comparison and matching with the next character string in the tabulation table T22. Then, as the next character string is "said", the search unit 113 is able to find a character string matching the character string read at step S302 in the tabulation table T22 through comparison and matching between the character strings.

When a pointer is obtained from the index T30, character information of the first to second character of the character string read at step S302 does not need to match completely. For example, in the index T30, in the next record of the record in which designation of the number of characters is "four characters" and the first to second characters are designated as "sa", the first to second characters are designated as "ta". In this case, if the character string read at step S302 is a character string such as "sort" which is between "sa" and "ta" in the alphabetical order, the pointer pt2 may be used.

By using the index T30 illustrated in FIG. 12, it is possible to narrow the range of the tabulation table T22 in which comparison and matching between character strings are performed by the search unit 113.

Figure 13:
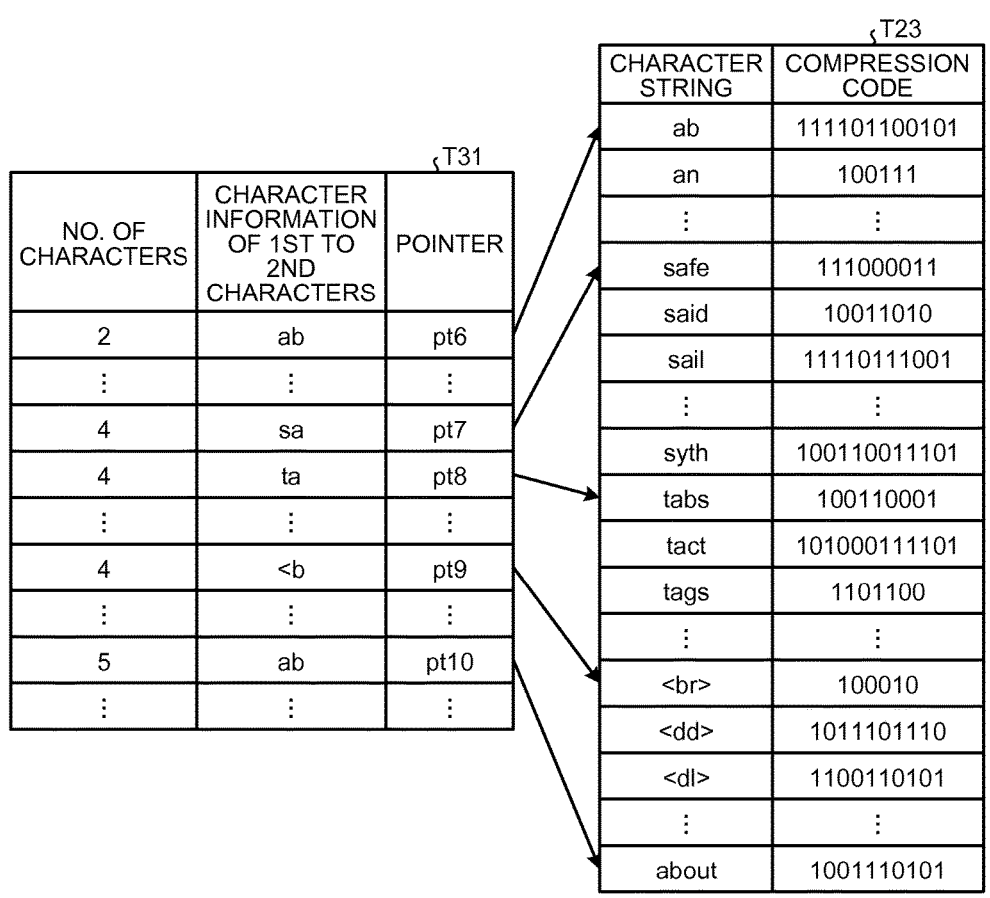
FIG. 13 illustrates an example of a compression dictionary table and an example of an index corresponding to the compression dictionary table according to an embodiment.

FIG. 13 illustrates an example of a compression dictionary table and an example of an index corresponding to the compression dictionary table. Similarly to the compression dictionary table T20 illustrated in FIG. 1, a compression dictionary table T23 indicates a correspondence relationship between a character string and a compression code. The character strings stored in the compression dictionary table T23 are stored in the increasing order of the number of characters, and character strings having the same number of characters are stored in the alphabetical order.

Similarly to the index T30, an index T31 includes fields storing the number of characters, character information of a given position in a character string, and a pointer. The pointer indicates a stored position in the compression dictionary table T23 corresponding to two conditions, namely the number of characters and character information at a given position. In the index T31, a given position is the first to second characters from the top in a character string. For example, a pointer pt6 of a record, in which the number of characters of a character string is two and character information of the first to second characters is "ab", indicates a stored position of the character string "ab" in the compression dictionary table T23. Further, a pointer pt7 of a record, in which the number of characters of a character string is four and character information of the first to second characters is "sa", indicates the stored position of a character string "safe" in the compression dictionary table T23, for example. Similarly, pt8 to pt10 indicate stored positions of a character string in the compression dictionary table T23. The respective records included in the index T31 are also stored in the increasing order of the number of characters, and further, those having the same number of characters are stored in the alphabetical order.

The search processing of step S406 in FIG. 11 is performed using the index T31, for example. The search unit 113 refers to a pointer stored in a record in which the number of characters of a character string read at step S402 and character information of the first to second characters of the character string read at step S402 match, in the index T31. A specific procedure is the same as the search processing performed using the index T30. By using the index T31 illustrated in FIG. 13, it is possible to narrow the range of the compression dictionary table T23 in which comparison and matching between character strings are performed by the search unit 113.

While, in the index T30 and the index T31, a given position of a character string is set to the first to second characters from the top of the character string, variations of a given position are also acceptable. For example, in one variation, a given position is set to the first character from the end of a character string. In such a variation, character strings stored in a tabulation table or a compression dictionary table are stored in the order of the number of characters, and character strings having the same number of characters are stored in the alphabetical order of the last character.

Further, while in the index T30 and the index T31 it is possible to perform narrowing based on both the number of characters and character information of a given position in a character string, an effect of narrowing can be achieved by either one of them. For example, narrowing can be realized by storing character strings in the order of the number of characters in a compression dictionary table or a tabulation table, and using an index in which a pointer indicating a storing position of a character string having a given number of characters in the compression dictionary table or the tabulation table is associated with a given number of characters. With use of a pointer associated with a given number of characters in the index when a character string having a given number of characters is read from a file of the compression target, a search range of the compression dictionary table or the tabulation table is narrowed. Similarly, in the case of storing character strings in a compression dictionary table or a tabulation table in the alphabetical order and using a pointer corresponding to the alphabet, for example, an effect of narrowing the search range can be achieved.

In order to maintain the search speed in a compression dictionary, there is a method using data of a tree structure such as a Huffman tree or a Trie tree. In such a method, data size equivalent to (or larger than) the compression dictionary is needed. As described above, as the search range of a compression dictionary is narrowed by using the index T30 or the index T31, the search speed can be maintained even if a search is performed without using tree structure data or the like. As such, a storage region for performing a search of a compression dictionary is reduced.

Hereinafter, an exemplary variation according to the above-described embodiment will be described. Besides the variation described below, a design change within the scope not deviating from the effect of the present invention can be made as appropriate.

For example, a compression dictionary table and a tabulation table may be combined in one table. In a combined table, regarding character strings which are common in the compression dictionary table and the tabulation table, compression codes corresponding to the character strings and the number of appearances are stored in association with each other. Further, in the combined table, information indicating the code length of a compression code corresponding to a character string is stored in association, for example.

Compression processing may be a monitor message output from the system, besides the data in a file. For example, processing such as compressing monitor messages, sequentially stored in the buffer, by the compression processing described above, and storing them as a log file, may be performed.

Without limiting to processing to convert a character string into a compression code, suppression of search processing by the presence/absence information described above can be made by processing to convert information of a first code system into information of a second code system. For example, a list of code strings of a first code system is stored in the storage unit 13 in advance, and a presence/absence information table is generated from definition information stored in the storage unit 13. The presence/absence information table can be generated by performing the processing procedure of FIG. 8 by the computer 1. For example, the computer 1 prepares a tabulation table based on the code string list, and performs tabulation of the code strings included in the file of the codes of the first code system (performed in the procedure of FIG. 10). In that case, by using the presence/absence information table, the search range of the code strings is narrowed. Further, the computer 1 prepares a correspondence table with code strings of the second code system based on the code string list, and performs conversion from the code strings of the first code system into the code strings of the second code system (performed by the procedure of FIG. 11), for example. Even in that case, by using the presence/absence information table, the search range of the code strings is narrowed.

According to an aspect of an embodiment, the processing amount of search processing performed on a character string group, to which compression codes have been assigned, can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a compression control program that causes a computer to execute a process comprising:
    obtaining a target character string including a plurality of target character units;
    judging whether the target character string is not included in a tabulation table utilizing presence information, the presence information including presence information in the tabulation table for each of a plurality of tabulation table character units regarding each of a plurality of positions in a character string that each of the plurality of tabulation table character units is included, each of the plurality of tabulation table character units being a character unit that is included in at least one of character strings included in the tabulation table, the character strings being character strings to which compression codes have been assigned;
    searching the target character string in the tabulation table when the target character string is not judged as not being included in the tabulation table;
    when the target character string is included in the character strings of an appearance frequency tabulation target, searching frequency tabulation information, and then when the target character string is included in the frequency tabulation information, updating the frequency tabulation information; and
    when the target character string is not included in the character strings of the appearance frequency tabulation target, refraining from searching the frequency tabulation information.

2. The non-transitory computer-readable recording medium according to claim 1, wherein the process further comprises:
    judging whether the target character string is not included in a tabulation table utilizing presence information and positions of the plurality of target character units in the target character.

3. A control method performed by a computer, the method comprising:
    obtaining a target character string including a plurality of target character units;
    judging whether the target character string is not included in a tabulation table utilizing presence information, the presence information including presence information in the tabulation table for each of a plurality of tabulation table character units regarding each of a plurality of positions in a character string that each of the plurality of tabulation table character units is included, each of the plurality of tabulation table character units being a character unit that is included in at least one of character strings included in the tabulation table, the character strings being character strings to which compression codes have been assigned;
    searching the target character string in the tabulation table when the target character string is not judged as not being included in the tabulation table;
    when the target character string is included in the character strings of an appearance frequency tabulation target, searching frequency tabulation information, and then when the target character string is included in the frequency tabulation information, updating the frequency tabulation information; and
    when the target character string is not included in the character strings of the appearance frequency tabulation target, refraining from searching the frequency tabulation information.

4. A control device comprising:
    a processor configured to:
    obtain a target character string including a plurality of target character units;
    judge whether the target character string is not included in a tabulation table utilizing presence information, the presence information including presence information in the tabulation table for each of a plurality of tabulation table character units regarding each of a plurality of positions in a character string that each of the plurality of tabulation table character units is included, each of the plurality of tabulation table character units being a character unit that is included in at least one of character strings included in the tabulation table, the character strings being character strings to which compression codes have been assigned;
    search the target character string in the tabulation table when the target character string is not judged as not being included in the tabulation table;
    when the target character string is included in the character strings of an appearance frequency tabulation target, search frequency tabulation information, and then when the target character string is included in the frequency tabulation information, update the frequency tabulation information; and when the target character string is not included in the character strings of the appearance frequency tabulation target, refrain from searching the frequency tabulation information.

5. The control method according to claim 3, further comprising judging whether the target character string is not included in a tabulation table utilizing presence information and positions of the plurality of target character units in the target character.

6. The control device according to claim 4, wherein the processor is further configured to judge whether the target character string is not included in a tabulation table utilizing presence information and positions of the plurality of target character units in the target character.

* * * * *